# 2,891,049
MONOAZO DYESTUFFS

Herbert-Joachim Exner, Koln-Stammheim, and Rolf Putter, Dusseldorf, Germany, assignors to Farbenfabriken Bayer Aktiengesellschaft, Leverkusen, Germany, a corporation of Germany No Drawing. Application August 14, 1956
Serial No. 603,885

Claims priority, application Germany August 19, 1955

5 Claims. (Cl. 260—199)

The present invention relates to monoazo dyestuffs and to a process for their manufacture; more particularly it relates to monoazo dyestuffs corresponding to the following general formula:

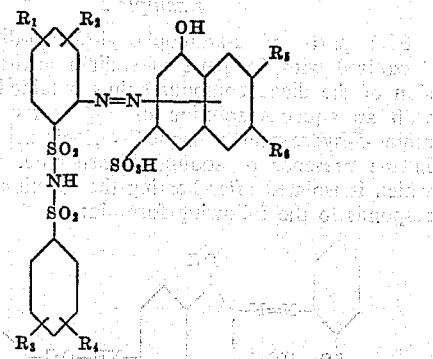

wherein $R_1$, $R_2$, $R_3$ and $R_4$ mean hydrogen or a non-solubilizing substituent, $R_5$ stands for hydrogen, an amino-, alkylamino-, aralkylamino-, arylamino- or acylamino group and $R_6$ means hydrogen and if $R_5$ stands for hydrogen, $R_6$ means an acylamino radical.

It is an object of the present invention to provide new monoazo dyestuffs and a process for their manufacture. It is a further object to provide new monoazo dyestuffs with good fastness properties.

The dyestuffs of the above said formula are obtainable by coupling diazotized aminophenyl-phenyldisulfamides of the following formula:

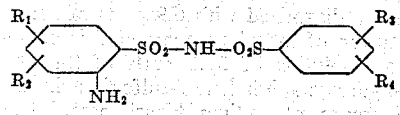

with azo compounds having the following formula:

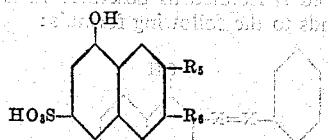

wherein $R_1$, $R_2$, $R_3$, $R_4$, $R_5$ and $R_6$ have the above meaning.

The diazo compounds which are to be used in accordance with the invention are obtainable e.g. by treating sulfonamides having the formula:

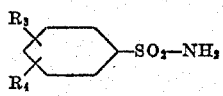

with o-nitrobenzene-sulfochlorides having the formula:

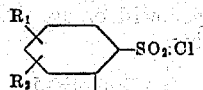

wherein $R_1$, $R_2$, $R_3$ and $R_4$ have the same meaning as above, in aqueous solution and, if the reaction is complete, by reducing the nitro group of these coupounds according to known methods.

The same products may be obtained by reacting o-nitro- resp. o-acylamino-benzene-sulfonamides of the following formula:

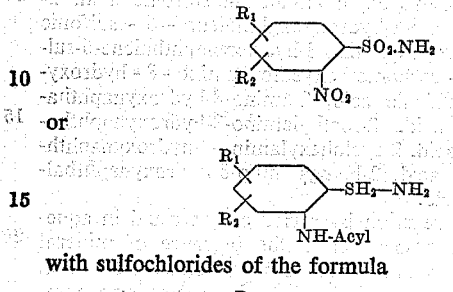

with sulfochlorides of the formula $$\underset{R_4}{\underset{|}{R_3}}\!\!\!\!\diagup\!\!\!\!\!-SO_2.Cl$$

wherein $R_1$, $R_2$, $R_3$ and $R_4$ have the above meaning, and reducing the nitro group of the reaction products thus obtain in usual manner, or converting the acylamino group into the corresponding free amino group.

Thus, 2-aminophenyl-phenyl-disulfamide can be prepared by treating benzene sulfonamide with o-nitrobenzene-sulfochloride in phenolphthalein-alkaline solution and reducing the nitro group of the resulting product with Raney nickel.

Suitable diazo compounds for producing the new monoazo dyestuffs are e.g.: 2-aminophenyl-phenyl-disulfimide, 2 - amino - 4 - chlorophenyl - phenyl - disulfimide, 2 - amino - 3,4 - dichlorophenyl - phenyl - disulfimide, 2 - aminophenyl - 4' - chlorophenyl - disulfimide, 2-aminophenyl - 4' - methylphenyl - disulfimide, 2 - aminophenyl - 4' - acetylaminophenyl - disulfimide, 2 - aminophenyl - 4' - benzoylaminophenyl - disulfimide, 2 - aminophenyl - 3',4' - dichlorophenyl - disulfimide, 2 - aminophenyl - 2',4' - dimethylphenyl - disulfimide, 2 - aminophenyl - 4' - methyl - 3' - chlorophenyl - disulfimide, 2-aminophenyl - 2' - methyl - 5' - chlorophenyl - disulfimide, 2 - amino - 4 - chlorophenyl - 3',4' - dichlorophenyl - disulfimide, 2 - amino - 4 - chlorophenyl - 4'-methyl-3'-chlorophenyl-disulfimide etc.

As coupling components there may be used e. g.: 2 - acetylamino - 5 - hydroxynaphthalene - 7 - sulfonic acid, 2 - chloroacetylamino - 5 - hydroxynaphthalene - 7- sulfonic acid, 2 - propionylamino - 5 - hydroxynaphthalene - 7 - sulfonic acid, 2 - β - chloropropionylamino - 5-hydroxynaphthalene - 7 - sulfonic acid, 2 - methoxyacetylamino - 5 - hydroxynaphthalene - 7 - sulfonic acid, 2-hexahydrobenzoylamino - 5 - hydroxynaphthalene - 7-sulfonic acid, 2 - butyroylamino - 5 - hydroxynaphthalene-7 - sulfonic acid, 2 - benzoylamino - 5 - hydroxynaphthalene - 7 - sulfonic acid, 2 - toluylamino - 5 - hydroxynaphthalene - 7 - sulfonic acid, 2 - (4' - phenylbenzoylamino)- 5 - hydroxynaphthalene - 7 - sulfonic acid, 2 - (2' - chlorobenzoylamino) - 5 - hydroxynaphthalene - 7 - sulfonic acid, 2 - (2',5' - dichlorobenzoylamino) - 5 - hydroxynaphthalene - 7 - sulfonic acid, 2 - carbomethoxyamino- 5 - hydroxynaphthalene - 7 - sulfonic acid, 2 - carboethoxyamino - 5 - hydroxynaphthalene - 7 - sulfonic acid, 2 - carbopropoxyamino - 5 - hydroxynaphthalene - 7 - sulfonic acid, 2 - carboisopropoxyamino - 5 - hydroxynaphthalene - 7 - sulfonic acid, 2 - carbobutoxyamino - 5-hydroxynaphthalene - 7 - sulfonic acid, 2 - carboisobutoxyamino - 5 - hydroxynaphthalene - 7 - sulfonic acid, 2-carbomethoxyethoxyamino - 5 - hydroxynaphthalene - 7-sulfonic acid.

2 - acetylamino - 8 - hydroxynaphthalene - 6 - sulfonic acid, 2-chloroacetylamino-8-hydroxynaphthalene - 6 - sulfonic acid, 2-dichloroacetylamino-8-hydroxynaphthalene-6-sulfonic acid, 2-ethoxyacetylamino-8-hydroxynaphthalene-6-sulfonic acid, 2-propionylamino-8-hydroxynaphthalene-6-sulfonic acid, 2-β-chloropropionylamino-8-hydroxynaphthalene-6-sulfonic acid, 2-benzoylamino-8-hydroxynaphthalene-6-sulfonic acid, 2-toluylamino-8-hydroxynaphthalene-6-sulfonic acid, 2-(4'-phenylbenzoylamino)-8-hydroxynaphthalene-6-sulfonic acid, 2-(2',5'-dichlorobenzoylamino)-8-hydroxynaphthalene-6-sulfonic acid, 2-carbomethoxyamino-8-hydroxynaphthalene - 6 - sulfonic acid, 2-carbopropoxyamino-8-hydroxynaphthalene-6-sulfonic acid, 2 - carbomethoxyethoxyamino - 8 - hydroxynaphthalene-6-sulfonic acid, 2-amino-8-hydroxynaphthalene-6-sulfonic acid, 2-methylamino-8-hydroxynaphthalene-6-sulfonic acid, 2-cyclohexylamino-8-hydroxynaphthalene-6-sulfonic acid, 2-benzylamino-8-hydroxynaphthalene-6-sulfonic acid.

The coupling reaction is carried out as usual in aqueous solution or suspension in the presence of mineral acids or weakly organic acids, such as acetic acid, or in neutral or alkaline medium. In this process, azo components of the above said structure which bear an acylamino group are coupled in neutral or alkaline solution in o-position to the hydroxy group while azo components containing an amino-, alkylamino-, aralkylamino- or arylamino group are reacted with diazo compounds in an acid medium, whereby coupling takes place in o-position to the amino group of the azo component.

The new azo dyestuffs dye wool and fibres of similar dyeing properties, such as polyamide and polyurethane fibres, from weakly acid bath in yellowish orange to yellowish red shades. The dyeings on wool are distinguished by a very good fastness to light and wet processing.

The following examples are given for the purpose of illustrating the invention, without, however, limiting it thereto; the parts being by weight.

*Example 1*

31.2 parts of 2-aminophenyl-phenyl-disulfimide are directly or indirectly diazotized with 6.9 parts of sodium nitrite. When the excess of nitrous acid is destroyed by the addition of amidosulfonic acid the suspension of the diazo compound obtained is combined with an aqueous solution of 28.2 parts of 2-acetylamino-5-hydroxynaphthalene-7-sulfonic acid and coupled while cooling in the presence of sodium bicarbonate within 5 hours. Then, the mixture is heated to 50–60° C. and the dyestuff is precipitated by addition of sodium chloride or by addition of hydrochloric acid and isolated. The dyestuff thus obtained corresponds to the formula:

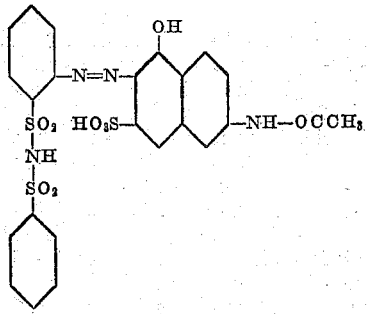

and dyes wool in clear strong yellowish orange shades of very good fastness to light and wetting.

*Example 2*

31.2 parts of 2-aminophenyl-phenyl-disulfimide are diazotized with 6.9 parts of sodium nitrite. The suspension of the diazo compound is combined with an aqueous solution of 33.0 parts of 2-β-chloropropionylamino-5-hydroxynaphthalene-7-sulfonic acid and coupled with cooling in the presence of sodium bicarbonate. After 5 hours, the reaction mixture is heated and the dyestuff is precipitated by addition of sodium chloride and/or hydrochloric acid and isolated. The dyestuff of the following formula:

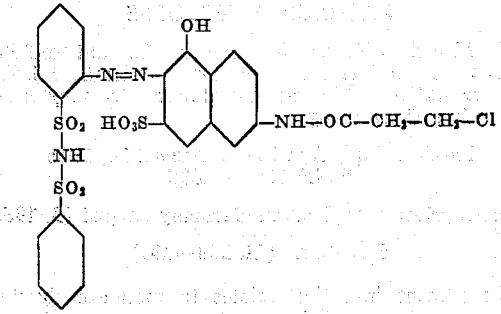

is obtained which dyes wool in strong clear yellowish orange shades of good fastness to light and wetting.

*Example 3*

31.2 parts of 2-aminophenyl-phenyl-disulfimide are diazotized with 6.9 parts of sodium nitrite; the suspension of the diazo compound thus obtained is combined with an aqueous solution of 34.2 parts of 2-benzoylamino-5-hydroxynaphthalene-7-sulfonic acid and coupled in the presence of sodium bicarbonate. The dyestuff which is isolated after heating the reaction mixture corresponds to the following formula:

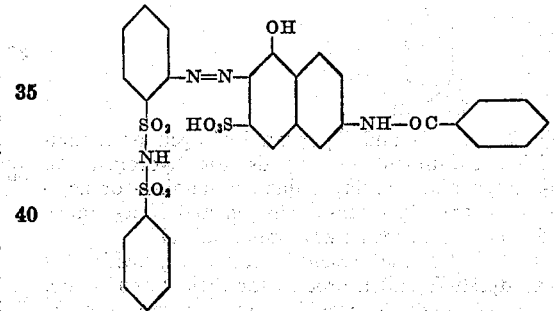

It dyes wool in clear orange shades of good fastness to light and wetting.

*Example 4*

36.9 parts of 2-aminophenyl-4'-acetylaminophenyl-disulfimide are diazotized with 6.9 parts of sodium nitrite; the suspension of the diazo compound is combined with an aqueous solution of 31.1 parts of 2-methoxyacetylamino-5-hydroxynaphthalene-7-sulfonic acid and coupled in the presence of sodium bicarbonate. The dyestuff obtained is isolated as described in Example 1. It corresponds to the following formula:

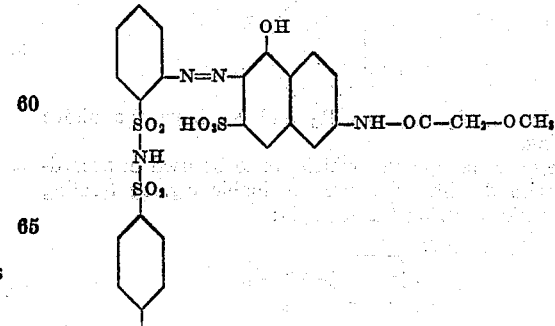

and dyes wool in yellowish orange shades of good fastness to light and wetting.

*Example 5*

40.4 parts of 2-amino-4-chlorophenyl-4'-acetylaminophenyl-disulfimide are diazotized with 6.9 parts of sodium nitrite; the diazo compound thus obtained is coupled in an aqueous solution with 34.2 parts of 2-carbo-methoxy-ethoxy-amino-5-hydroxynaphthalene-7-sulfonic acid in the presence of sodium bicarbonate, the reaction mixture is initially cooled and heated after a few hours. The dyestuff obtained can be isolated as described in Example 1. It corresponds to the formula:

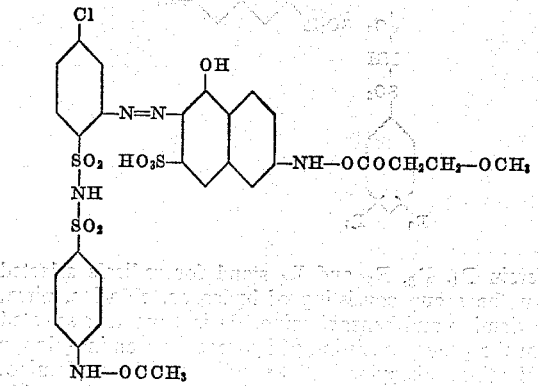

and dyes wool in reddish yellow shades of very good fastness to light and wetting.

*Example 6*

38.1 parts of 2-aminophenyl-3',4'-dichlorophenyl-disulfimide are diazotized with 6.9 parts of sodium nitrite. The diazo compound is coupled with an aqueous solution of 31.2 parts of 2-carboethoxyamino-8-hydroxynaphthalene-6-sulfonic acid, while the solution is rendered soda-alkaline. The isolated dyestuff having the following formula:

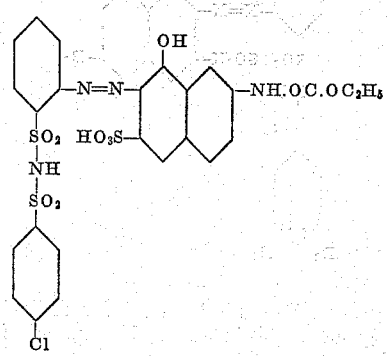

dyes wool in yellowish red shades of good fastness to light and wetting.

*Example 7*

36.9 parts of 2-aminophenyl-3'-acetylaminophenyl-disulfimide are diazotized with 6.9 parts of sodium nitrite. The suspension of the diazo compound thus obtained is coupled with an aqueous solution of 41.2 parts of 2-(2',5'-dichlorobenzoylamino)-8-hydroxynaphthalene-6-sulfonic acid in the presence of sodium carbonate. The dyestuff which is isolated as described in Example 1 corresponds to the following formula:

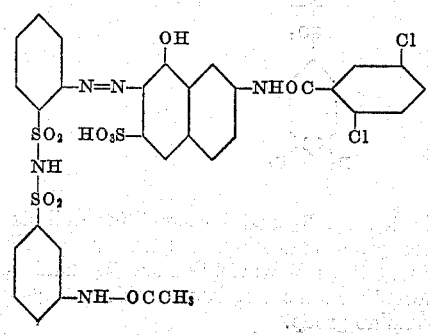

It dyes wool in yellow red shades of good fastness to light and wetting.

*Example 8*

31.2 parts of 2-aminophenyl-phenyl-disulfimide are indirectly diazotized with 6.9 parts of sodium nitrite. After removing an excess of nitrite, the suspension of the diazo compound is mixed with a suspension of 23.9 parts of 2-amino-8-hydroxynaphthalene-6-sulfonic acid, the reaction mixture is adjusted to a pH-value of 4 by addition of sodium acetate and stirred for 16 hours at a temperature of 0–5° C. Then, the mixture is further neutralized, stirred for a further few hours, heated to 60–70° C. and the dyestuff is isolated by addition of sodium chloride. The dyestuff obtained corresponds to the following formula:

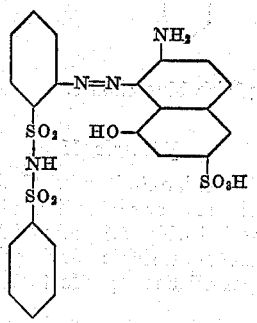

It dyes wool in clear red shades of very good fastness to light and wetting.

The diazo compound 2-aminophenyl-phenyl-disulfimide used in this example can be prepared as follows: 91 parts of o-nitrobenzene-sulfochloride are added at 70° C. to 65 parts of benzene sulfonamide in 400 parts of water and the pH-value of the solution is adjusted to phenol-phthalein-alkaline reaction by addition of soda lye. When the compounds are completely dissolved, the mixture is rendered neutral, if necessary clarified, and the dissolved compound is reduced by treating with a solution of Raney nickel. Then, 2-aminophenyl-phenyl-disulfimide is precipitated by adding a mineral acid. 111 parts of the product are obtained which melts at 193–194° C.

*Example 9*

37.1 parts of 2-aminophenyl-4-acetylaminophenyl-disulfimide are indirectly diazotized with 6.9 parts of sodium nitrite and coupled at a pH-value of 4–5 with 23.9 parts of 2-amino-8-hydroxynaphthalene-6-sulfonic acid within 24 hours. The mixture is heated to 60° C. and the dyestuff obtained is isolated by addition of sodium chloride. It corresponds to the following formula

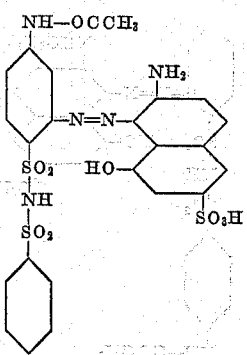

and represents a red powder having a very good levelling power. It dyes wool in red shades which are fast to light.

*Example 10*

2-amino-5-nitrophenyl-phenyl-disulfimide are indirectly diazotized with 6.9 parts of sodium nitrite and coupled at a pH-value of 4-5 with 23.9 parts of 2-amino-8-hydroxynaphthalene-6-sulfonic acid within 24 hours at a temperature of 0-5° C. The isolated dyestuff having the following formula:

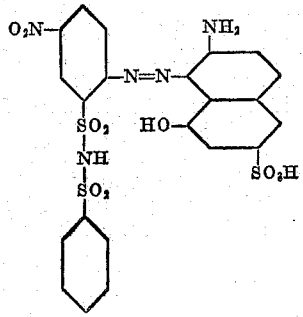

dyes wool in reddish blue shades.

Example 11

35.7 parts of 2-amino-5-nitrophenyl-phenyl-disulfimide are diazotized with 6.9 parts of sodium nitrite and coupled at a pH-value of 4-5 with 25.3 parts of 2-methylamino-8-hydroxynaphthalene-6-sulfonic acid within 24 hours. The isolated dyestuff corresponds to the following formula:

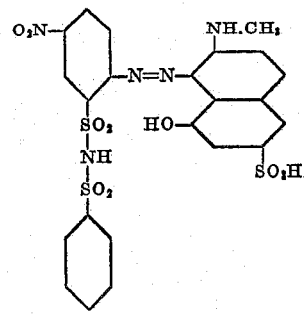

and dyes wool from acid bath in blue shades of good fastness to wetting.

Example 12

37.1 parts of 2-aminophenyl-4-acetylaminophenyl-disulfimide are indirectly diazotized with 6.9 parts of sodium nitrite and coupled at a pH-value of 4-5 with 31.5 parts of 2-phenylamino-8-hydroxynaphthalene-6-sulfonic acid. The isolated dyestuff corresponds to the following formula

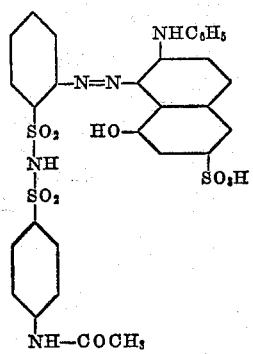

and dyes wool in reddish bordeaux shades of very good fastness to light and wetting. A dyestuff of similar dyeings properties is obtained if, instead of 31.5 parts of 2-phenylamino-8-hydroxynaphthalene-6-sulfonic acid, 32.9 parts of 2-(4'-methylphenylamino)-8-hydroxynaphthalene-6-sulfonic acid are used.

We claim:
1. A monoazo dyestuff corresponding to the following formula:

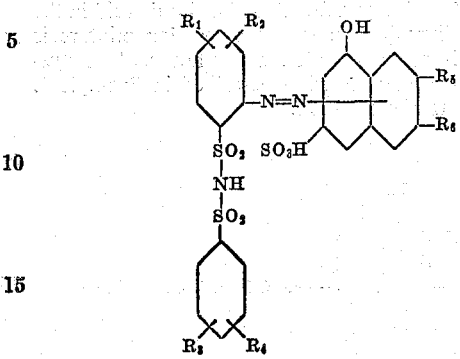

wherein $R_1$, $R_2$, $R_3$ and $R_4$ stand for radicals selected from the group consisting of hydrogen, chlorine, nitro, acetylamino and benzoylamino, $R_5$ is a member selected from the group consisting of hydrogen, an amino-, lower alkylamino, phenylamino, benzylamino, benzoylamino, chloro-substituted-benzoylamino, lower aliphatic amido and urethane group and $R_6$ means a radical selected from the group consisting of hydrogen and, if $R_5$ stands for hydrogen, a benzoylamino and a lower aliphatic acylamino group.

2. A monoazo dyestuff corresponding to the following formula:

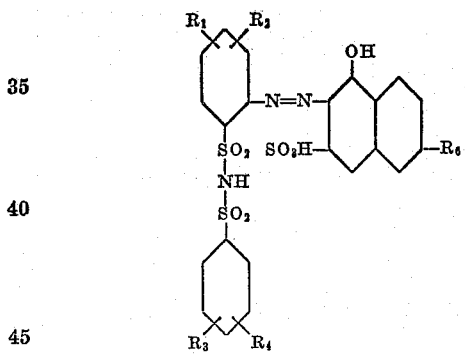

wherein $R_1$, $R_2$, $R_3$ and $R_4$ stand for radicals selected from the group consisting of hydrogen, chlorine, nitro, acetylamino and benzoylamino and $R_6$ stands for a radical selected from the acetylamino, chloroacetylamino and benzoylamino group.

3. A monoazo dyestuff corresponding to the following formula:

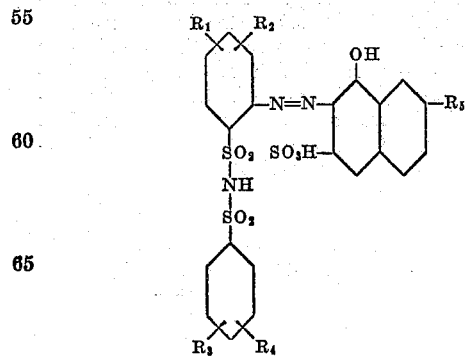

wherein $R_1$, $R_2$, $R_3$ and $R_4$ stand for radicals selected from the group consisting of hydrogen, chlorine, nitro, acetylamino and a benzoylamino and $R_5$ stands for a radical selected from the acetylamino, chloroacetylamino and benzoylamino group.

4. The monoazo dyestuff corresponding to the formula:
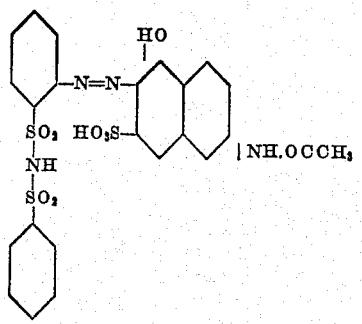
5. The monoazo dyestuff corresponding to the formula:
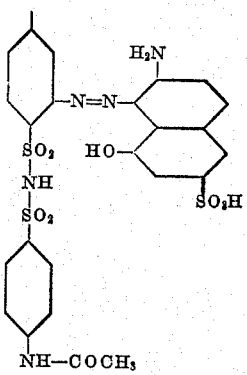
References Cited in the file of this patent
UNITED STATES PATENTS
| | | |
|---|---|---|
| 2,358,519 | Krebser et al. | Sept. 19, 1944 |
| 2,518,078 | Schmid et al. | Aug. 8, 1950 |